March 21, 1939.  H. E. ROCKEFELLER  2,151,334
METHOD OF JOINING METAL MEMBERS
Filed Sept. 20, 1934
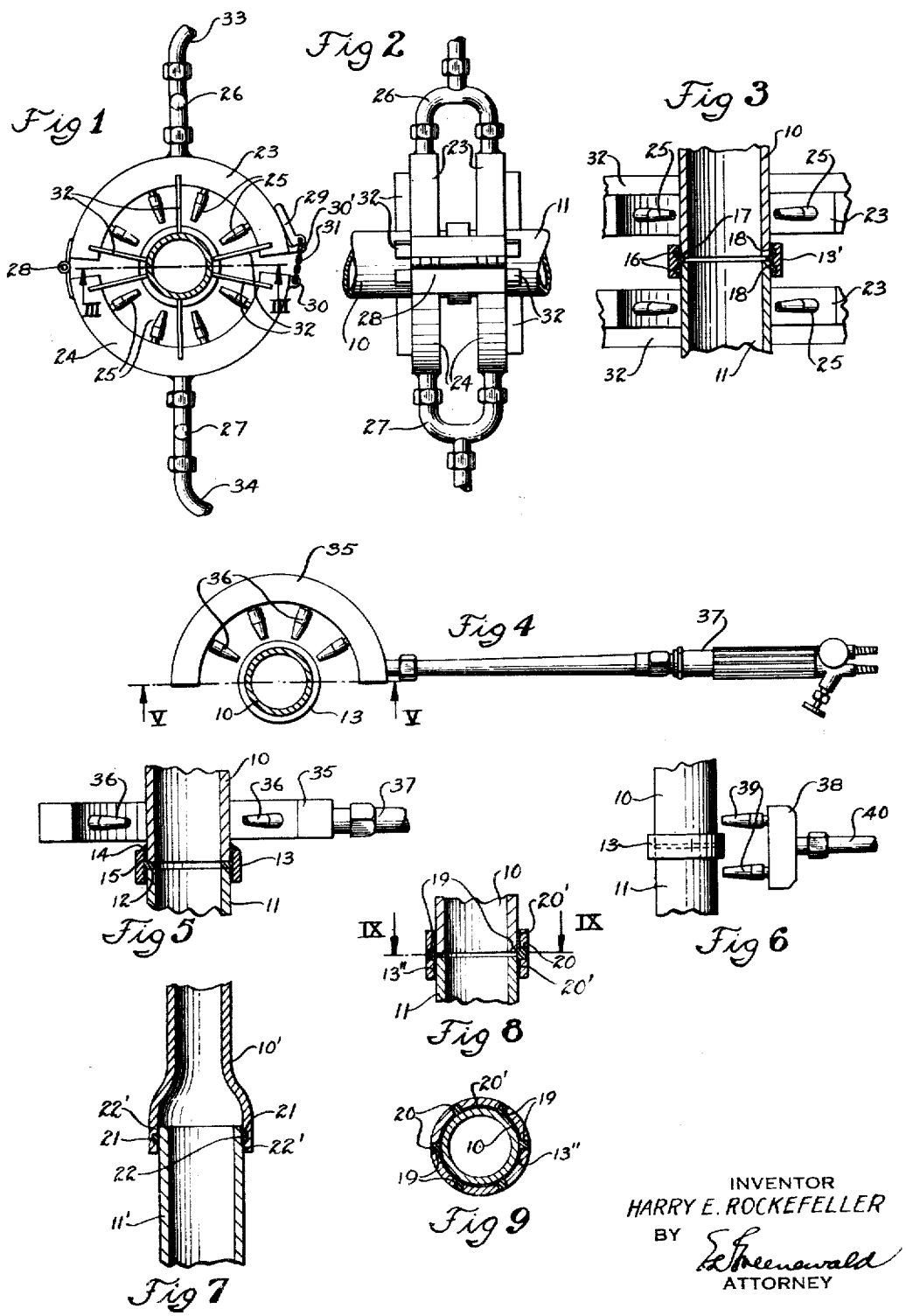
INVENTOR
HARRY E. ROCKEFELLER
BY
ATTORNEY Patented Mar. 21, 1939

2,151,334

UNITED STATES PATENT OFFICE 2,151,334

METHOD OF JOINING METAL MEMBERS

Harry E. Rockefeller, New York, N. Y., assignor, by mesne assignments, to Union Carbide and Carbon Corporation, a corporation of New York Application September 20, 1934, Serial No. 744,751

9 Claims. (Cl. 113—112)

This invention relates to a method of joining metals.

Metal members are generally joined by welding in which a welding rod is fused and deposited between the contiguous edges of the members which have been heated to a welding temperature. To insure firm and sound welded joints that are produced in this manner, the operator or welder usually is a person who has acquired welding skill and technique. In many instances, however, it is desired to join metals without the need of a skilled welder. One such instance is the joining of pipe sections in heating and water systems. It is highly desirable to join such pipe sections without resorting to welding, as above-described, or to the necessity of threading pipe sections and providing threaded plumbing fittings.

The primary object of this invention is to provide an improved method of joining metals which is relatively simple and economical, and does not require the services of a skilled welder.

The objects and advantages of this invention will become apparent as the following description proceeds, having reference to the accompanying drawing, in which:

Fig. 1 is a view of a double-ring burner for effectively joining pipe sections in accordance with my improved method, the burner being disposed about and adjacent a joint to be formed between the abutting ends of two pipes;

Fig. 2 is a side view of the double-ring burner illustrated in Fig. 1;

Fig. 3 is a sectional view taken at line III—III of Fig. 1 illustrating one manner in which a joint can be prepared and the pipe sections united in accordance with my method;

Fig. 4 illustrates a single burner of semi-circular shape which can be effectively employed to practice my improved method of joining metals;

Fig. 5 is a view taken at line V—V of Fig. 4 to illustrate another manner of preparing a joint and uniting pipe sections or parts with my improved method;

Fig. 6 illustrates a burner which can be employed to practice this invention either in joining the abutting ends of pipes or contiguous edges of plates or other structural shapes;

Figs. 7 and 8 illustrate further modifications in the manner of preparing joints prior to uniting the pipe sections or parts; and Fig. 9 is a view taken at line IX—IX of Fig. 8 to illustrate more clearly the manner in which this joint is prepared.

In accordance with the present invention, an improved and simplified method of joining metal members or parts is provided in which solid brazing metal is disposed or inserted adjacent the surfaces of the metal members arranged to be joined, the so disposed or inserted metal having a fusion point lower than that of the metal members. Heat is then applied indirectly to the so disposed or inserted metal by conduction through one or both of the metal members, as the case may be, in such a manner and with sufficient intensity to cause the inserted metal to melt or fuse and upon solidification unite the metal members together.

In the drawing I have illustrated several ways in which joints of pipe sections or conduits can be prepared or formed to unite the same in accordance with my improved method. It is to be understood, however, that the principles of this invention are equally applicable to the joining of plates or other structural shapes.

In Fig. 5 of the drawing there is shown one manner of joining conduits in accordance with the present method in which the opposed ends of conduits 10 and 11 are arranged in spaced relation. In the space between the opposed ends of the pipe parts or sections is inserted a metallic ring 12 having a fusion or melting point lower than that of the conduits 10 and 11. A ferrule or sleeve 13, which may be formed of the same material as either the conduits 10 and 11 so that its fusion point will be higher than that of the metallic ring 12, is then placed over the metallic ring and the ends of the conduits. The ferrule 13 may be tack-welded to one of the conduits, as at 14, for example, to maintain the same in position at the joint. After the joint is thus formed, heat may be applied in any suitable manner on the peripheral surfaces of the conduits at points spaced longitudinally of the conduits. Although I do not wish to be limited thereto, I preferably employ burners or blowpipes, which may be supplied with a suitable combustible gas, such as a mixture of oxygen and acetylene, as the source of heat. In this manner portions of the peripheral surface spaced from the extreme ends of the conduits are raised to an elevated temperature, and this heat is conducted through the conduits toward the extreme ends thereof and to the ferrule. When the extreme ends of the conduits are at a temperature which corresponds to the fusion or melting point of the metallic ring 12, the ring 12 will commence to melt or fuse. Since the contacting surfaces of the outer wall of the conduits and the inner wall of the ferrule are at a temperature which is the fusion point of the ring 12, the fused metal will readily flow between the contacting surfaces toward the ends of the ferrule and form a firm and sound joint.

When the heat is applied on the peripheral surfaces of the conduits with a single blowpipe flame, the flame applied on each conduit can be moved about the entire circumference of the conduits. As soon as the fused metal appears at a particular point at the end of the ferrule 13, the flame can be applied on the peripheral surface at a point in direct alignment with the point where the fused metal is visible and then gradually moved about the circumference of the conduit. With this procedure the heat is conducted rapidly through the conduit to the point where fusion of the metal is greatest; and it will be found out that, as the flame is moved about the conduit, the fused metal will appear at the end of the ferrule 13 at successive portions corresponding to the circumferential movement of the flame.

When the fused metal is visible about the entire circumference of the conduits at the ends of the ferrule 13, the application of heat can be stopped. The melted or fused metal which has flowed between the contacting surfaces of the ferrule and conduits, as indicated at 15, will then solidify to form a sound and firm bond. By providing the ferrule 13 a joint is formed having greater strength than that of the conduits 10 and 11.

When it is desired to provide a joint only having a strength equal to the strength of the metallic ring 12 in shear, the ferrule 13 may be omitted. In such cases, the conduits 10 and 11 are maintained together under pressure during the interval of the time the heat is applied and the ring 12 is fusing. As soon as sufficient melting or fusing of the metallic ring has taken place to insure a firm and sound bond between the ring 12 and the extreme ends of the conduits, the application of heat is stopped.

In Fig. 3 is illustrated another manner in which a joint can be formed in accordance with the present invention. In this embodiment the ferrule 13' may be provided with two annular recesses 16 filled with metal 17 having a fusion point lower than that of the ferrule 13' and the conduits 10 and 11. As in the embodiment previously described, heat is applied on portions of the peripheral surfaces of the conduits which are spaced from the extreme ends thereof, and this heat is conducted longitudinally of the conduits to cause melting or fusion of the metal 17 so that it will flow between the contacting surfaces of the ferrule and the conduits, as indicated at 18, and upon solidification unite the conduits 10 and 11 together.

Another manner of preparing and forming joints with my method is illustrated in Figs. 8 and 9. In this embodiment of the invention a ferrule 13" is employed having spaced openings 19 about the peripheral surface thereof. The openings 19 are filled with metal 20 having a fusion point lower than that of the ferrule 13" and the conduits 10 and 11. As shown in Fig. 8, the conduits 10 and 11 are arranged in abutting relation and the ferrule 13" is placed over the opposed ends of the conduits with the openings 19 therein adjacent to the joint between the conduits. As in the joints above-described, heat may be applied indirectly to the metal 20 by conduction through one or both of the conduits. Sufficient heat may be applied only on the peripheral surface of the conduit 10, for example, at a point spaced longitudinally of the conduit from the joint, so that the heat conducted through the conduit will cause the metal 20 in the openings 19 in the ferrule to melt or fuse and flow between the contacting surfaces of the ferrule 13" and conduits 10 and 11, as indicated at 20', and upon solidification unite the latter together.

In many instances joints in conduits are formed with the end of one conduit telescoped within the end of another conduit. Such a joint is illustrated in Fig. 7 with the larger end of conduit 10' fitted over the smaller end of conduit 11'. In this arrangement the conduits 10' and 11' can be united with my method by forming an annular recess 21 about the inner surface of the conduit 10' near its end. This recess may be filled with a metal 22 having a fusion point lower than that of the conduits 10' and 11', and heat may be applied thereto by conduction through one or both of the conduits, as described above, to cause the metal 22 to fuse and flow between the contacting surfaces of the conduits 10' and 11', as indicated at 22'; and upon solidification unite them together.

The foregoing method has been successfully employed in joining iron and steel members. In joining steel members the metal arranged adjacent the contacting surfaces of the members and having a lower fusion point than the members may be an alloy of copper including at least one of a group consisting of tin or zinc. One such metal which I preferably employ is a bronze consisting of about 56 to 59% copper, .75 to 1.10% tin, .75 to 1.25% iron, .01 to .05% manganese, .08 to .14% silicon, about .10% lead, and the remainder zinc. In using bronze of the foregoing composition sufficient heat is applied on a steel member at a suitable distance from the joint so that the steel surfaces adjacent the bronze will reach a temperature of at least about 1620° F. At this temperature the bronze will commence to fuse and flow between the heated contacting surfaces of the members. By heating the bronze indirectly by conduction through both of the steel members it will be quite evident that the adjacent surfaces of the steel members will always be at an elevated temperature at the time the bronze commences to and is melting or fusing. In this manner the bronze will melt and effectively tin the contacting surfaces of the members to be joined and insure a firm and sound joint.

To make certain that the contacting surfaces of the steel members to be joined are clean so that the bronze will properly tin thereon, a suitable flux is employed. The bronze metal and contacting surfaces of the steel members may be painted or coated with the flux in any convenient manner. In joining conduits, for example, the ends of the conduits may be dipped into the flux. A flux which may be used in joining steel members comprises a mixture of borax and boric acid.

When the conduits to be joined are arranged with their axes in a vertical position, and heat is applied on the peripheral surfaces at points spaced from the ends of the conduits, the metal of lower fusion point flows upward as well as downward between the contacting surfaces to be joined. This is due to the capillary attraction and repulsion which results from the relatively small space between the contacting and opposing surfaces of the members to be joined. Thus, when the ends of conduits are telescoped one within the other the capillary action takes place in the small and minute space between the contacting surfaces of the outer wall of the inner conduit and the inside wall of the outer conduit. When the conduits to be joined are arranged in abutting relation and a ferrule is employed, the capillary action occurs in the small and minute space between the outer walls at the ends of the conduits and the inner wall of the ferrule.

Since the metal members to be joined are not heated by the present method to as high an elevated temperature as in fusion welding, considerably less distortion of the metal occurs in the present method. Further, in joining pipes and conduits, there is a complete elimination of internal protrusions which are generally produced when such members are joined by ordinary fusion welding.

Although heat may be applied to metal members with an ordinary burner torch, or other suitable heating means, I provide apparatus particularly adapted to join metal members according to the above-described method. In Figs. 1, 2 and 3 I have shown one embodiment of apparatus for practicing the method of my invention comprising a double ring burner disposed about the abutting ends of conduits 10 and 11. This burner comprises a plurality of hollow manifold blocks 23 and 24 of semi-circular shape arranged to form a double ring with the ends thereof disposed adjacent to each other. Nozzles 25 extending radially inward are secured to the manifold blocks in spaced relation to direct heating flames over the entire peripheral surfaces of the conduits at portions thereof spaced from the extreme ends of the conduits.

Each pair of manifold blocks 23 and 24 is maintained in spaced and parallel relation by U-shaped conduits 26 and 27, respectively, the ends of which are secured, as by welding, to the manifold blocks intermediate the ends thereof; by a hinge member 28 extending between each pair of manifold blocks and secured to adjacent and opposing ends thereof; and by members 30 and 30' connected across the ends of the manifold blocks 23 and 24, respectively, opposite to those to which the hinge member 28 is secured. When the manifold blocks are disposed about the ends of the aligned conduits, the ends of the manifold blocks to which the members 30 and 30' are secured may be clamped together in any suitable manner, as by a chain 31 having a clamping lever 29'.

To maintain the manifold blocks 23 and 24 in an operating position on the conduits 10 and 11 with the tips of the nozzles 25 spaced from the conduits, clamping plates 32 are provided. These plates 32 are secured to the manifold blocks, extend radially inward, and the inner ends thereof are adapted to contact the conduits. It will thus be seen that, when the manifold blocks 23 and 24 are clamped in position on the conduits 10 and 11, as shown in Fig. 2, heat will be applied about the entire peripheral surface of the conduits in the minimum length of time and with little effort on the part of an operator. The U-shaped conduits 26 and 27 may be connected through flexible conduits 33 and 34 to a source of supply of combustible gas (not shown).

In many instances it may be desirable to apply heat only to peripheral portions of a single conduit. In such cases the burner shown in Figs. 4 and 5 can be effectively employed. This burner comprises a single hollow manifold block 35 of semi-circular shape having a plurality of nozzles 36 secured thereto in spaced relation and extending radially inward. One end of the manifold block 35 may be connected to a handle 37 having passages therein through which a suitable combustible gas may be delivered. By providing a plurality of nozzles 36 and moving these nozzles about the peripheral surface of the conduit 10 at a point spaced from the extreme end thereof, heat can be applied relatively quickly on the conduit to cause fusing of the metal ring 12.

In Fig. 6 I have shown another burner which can be effectively employed in joining the contiguous edges of meal plates or other structural shapes as well as the abutting ends of conduits. This burner comprises a hollow manifold block 38 of rectangular shape having nozzles 39 connected thereto in spaced relation. The block 38 may be connected to a handle 40 having passages for delivering a combustible gas to the nozzles 39. By moving the nozzles 39 relatively to metal members to be joined, such as the conduits 10 and 11, with each nozzle directing a gaseous heating flame on a metal member, heat will be conducted simultaneously through the metal members toward the joint to cause the metal of lower fusion point to fuse and join the members.

The herein disclosed apparatus, which I prefer to employ in carrying out my improved process of joining metal members, constitutes the subject matter of my copending divisional application Serial No. 232,564, filed September 30, 1938, for "Apparatus for joining metal members."

I claim:

1. A method of joining pipe sections which comprises the steps of arranging the pipe sections with the ends thereof in abutting relation; placing a ferrule over the abutting ends of the pipe sections and inserting metal adjacent the contacting surfaces of the pipe sections and the ferrule, the inserted metal having a fusion point lower than that of the pipe sections; applying heat indirectly to the inserted metal by conduction longitudinally through both of the pipe sections simultaneously and with sufficient intensity to cause the inserted metal to fuse and flow between the contacting surfaces of the ferrule and pipe sections and tin the same; and discontinuing the application of heat so as to cause the inserted metal to solidify and unite the ferrule and pipe sections together.

2. A method of joining conduits which comprises arranging the conduits with the ends thereof adjacent to each other, providing a ferrule having spaced openings about the peripheral surface thereof filled with metal having a fusion point lower than that of the ferrule and the conduits, placing the ferrule over the opposed ends of the conduits with the openings therein adjacent to and near the joint between the conduits, and applying heat to at least one of the conduits at a point spaced longitudinally of the conduit from the joint so that the heat conducted through the conduit will heat the contacting surfaces of the conduit and ferrule to a temperature at or above the fusion point of the metal and also cause the metal in the openings in the ferrule to fuse and flow between the contacting surfaces of the ferrule and conduits and upon solidification unite the latter together.

3. A method of joining pipe sections which comprises the steps of inserting metal adjacent the surfaces of the pipe sections arranged to be joined, the inserted metal having a fusion point lower than that of said pipe sections, and applying heat substantially uniformly around the periphery of each of said pipe sections and at a spaced distance from said inserted metal, such heat being of sufficient intensity to raise solely by induction the temperature of said pipe sections adjacent said metal to a point sufficient to cause said metal to melt and adhere to said sections, and upon subsequent solidification to unite said sections together.

4. A method of joining pipe sections which comprises the steps of arranging the pipe sections in abutting relation; placing a ferrule over the abutting ends of said pipe sections; disposing solid brazing metal for flow communication when melted with opposed surfaces of the pipe sections and the ferrule, the brazing metal having a fusion point lower than that of said pipe sections; applying heat indirectly to the brazing metal by conduction longitudinally through both of said pipe sections simultaneously and with sufficient intensity to cause the brazing metal to melt and flow between the opposed surfaces of the ferrule and pipe sections and tin the same; and discontinuing the application of heat to cause the molten brazing metal to solidify and unite the pipe sections and ferrule together.

5. A method of joining pipe sections which comprises the steps of disposing brazing metal adjacent the surfaces of the pipe sections arranged to be joined, the brazing metal having a fusion point lower than that of said pipe sections, and applying heat substantially uniformly around the periphery of each of said pipe sections and at a spaced distance from said brazing metal, such heat being of sufficient intensity to raise solely by conduction the temperature of said pipe sections adjacent said metal to a point sufficient to cause said brazing metal to melt and adhere to said sections, and upon subsequent solidification to unite said sections together.

6. A method of brazing metal members which comprises the steps of inserting between opposed surfaces of the members a fusible metal body having a fusion point lower than that of said members, and heating both of said members simultaneously whereby to melt said body solely by heat conducted thereto and longitudinally through both members, both opposed surfaces of said members being thus properly heated and prepared for full tinning coaction with said body which upon subsequent cooling wholly unites said surfaces.

7. A method of brazing metal members which comprises the steps of overlapping surfaces of the members so that they are in direct surface-to-surface contact with each other, disposing adjacent said surfaces a fusible metal body having a fusion point lower than that of said members, and melting said body by heat conducted thereto solely through both of said members longitudinally whereby both contacting surfaces are fully heated and suitably prepared for receiving between them by capillary attraction the molten metal which upon subsequent cooling unites said overlapping surfaces.

8. A method of brazing metal conduit parts which comprises the steps of arranging the conduit parts in abutting end-to-end relation, disposing adjacent said abutment a fusible metal having a fusion point lower than that of the conduit parts, and melting said metal solely by heat conducted thereto and longitudinally through both of said conduit parts so that the molten metal fills the capillary space between said conduit parts by capillary flow and upon cooling solidifies and unites said parts.

9. A method of brazing metal conduit parts which comprises the steps of telescoping the conduit parts, there being disposed adjacent the telescoping parts a fusible metal having a fusion point below that of said conduit parts, and melting said metal by heat conducted thereto solely through both of the conduit parts longitudinally so that it unites the telescoping parts upon subsequent cooling and solidification.

HARRY E. ROCKEFELLER.

CERTIFICATE OF CORRECTION.

Patent No. 2,151,334.  March 21, 1939.

HARRY E. ROCKEFELLER.

It is hereby certified that error appears in the printed specification of the above numbered patent requiring correction as follows: Page 2, first column, line 8, after "the" insert melted or; page 3, second column, line 12, for the word "meal" read metal; page 4, first column, line 3, claim 3, for "induction" read conduction; and that the said Letters atent should be read with this correction therein that the same may conform o the record of the case in the Patent Office.

Signed and sealed this 2nd day of May, A. D. 1939.

Henry Van Arsdale (Seal)  Acting Commissioner of Patents.

spaced distance from said inserted metal, such heat being of sufficient intensity to raise solely by induction the temperature of said pipe sections adjacent said metal to a point sufficient to cause said metal to melt and adhere to said sections, and upon subsequent solidification to unite said sections together.

4. A method of joining pipe sections which comprises the steps of arranging the pipe sections in abutting relation; placing a ferrule over the abutting ends of said pipe sections; disposing solid brazing metal for flow communication when melted with opposed surfaces of the pipe sections and the ferrule, the brazing metal having a fusion point lower than that of said pipe sections; applying heat indirectly to the brazing metal by conduction longitudinally through both of said pipe sections simultaneously and with sufficient intensity to cause the brazing metal to melt and flow between the opposed surfaces of the ferrule and pipe sections and tin the same; and discontinuing the application of heat to cause the molten brazing metal to solidify and unite the pipe sections and ferrule together.

5. A method of joining pipe sections which comprises the steps of disposing brazing metal adjacent the surfaces of the pipe sections arranged to be joined, the brazing metal having a fusion point lower than that of said pipe sections, and applying heat substantially uniformly around the periphery of each of said pipe sections and at a spaced distance from said brazing metal, such heat being of sufficient intensity to raise solely by conduction the temperature of said pipe sections adjacent said metal to a point sufficient to cause said brazing metal to melt and adhere to said sections, and upon subsequent solidification to unite said sections together.

6. A method of brazing metal members which comprises the steps of inserting between opposed surfaces of the members a fusible metal body having a fusion point lower than that of said members, and heating both of said members simultaneously whereby to melt said body solely by heat conducted thereto and longitudinally through both members, both opposed surfaces of said members being thus properly heated and prepared for full tinning coaction with said body which upon subsequent cooling wholly unites said surfaces.

7. A method of brazing metal members which comprises the steps of overlapping surfaces of the members so that they are in direct surface-to-surface contact with each other, disposing adjacent said surfaces a fusible metal body having a fusion point lower than that of said members, and melting said body by heat conducted thereto solely through both of said members longitudinally whereby both contacting surfaces are fully heated and suitably prepared for receiving between them by capillary attraction the molten metal which upon subsequent cooling unites said overlapping surfaces.

8. A method of brazing metal conduit parts which comprises the steps of arranging the conduit parts in abutting end-to-end relation, disposing adjacent said abutment a fusible metal having a fusion point lower than that of the conduit parts, and melting said metal solely by heat conducted thereto and longitudinally through both of said conduit parts so that the molten metal fills the capillary space between said conduit parts by capillary flow and upon cooling solidifies and unites said parts.

9. A method of brazing metal conduit parts which comprises the steps of telescoping the conduit parts, there being disposed adjacent the telescoping parts a fusible metal having a fusion point below that of said conduit parts, and melting said metal by heat conducted thereto solely through both of the conduit parts longitudinally so that it unites the telescoping parts upon subsequent cooling and solidification.

HARRY E. ROCKEFELLER.

CERTIFICATE OF CORRECTION.

Patent No. 2,151,334.　　　　　　　　　　　　　March 21, 1939.

HARRY E. ROCKEFELLER.

It is hereby certified that error appears in the printed specification of the above numbered patent requiring correction as follows: Page 2, first column, line 8, after "the" insert melted or; page 3, second column, line 12, for the word "meal" read metal; page 4, first column, line 3, claim 3, for "induction" read conduction; and that the said Letters atent should be read with this correction therein that the same may conform ɔ the record of the case in the Patent Office.

Signed and sealed this 2nd day of May, A. D. 1939.

Henry Van Arsdale (Seal)　　　　　　　　　　　　　　　　　　　　Acting Commissioner of Patents.